(12) United States Patent
Shin et al.

(10) Patent No.: US 10,814,572 B2
(45) Date of Patent: Oct. 27, 2020

(54) AIRLESS TIRE MANUFACTURING METHOD

(71) Applicant: Kumho Tire Co., Inc., Gwangju (KR)

(72) Inventors: Gwi Seong Shin, Gwangju (KR); Kee Woon Kim, Gwangju (KR); Soon Wook Hwang, Gwangju (KR); Chul Woo Kwark, Gwangju (KR)

(73) Assignee: KUMHO TIRE CO., INC., Gwangju (KR)

( * ) Notice: Subject to any disclaimer, the term of this patent is extended or adjusted under 35 U.S.C. 154(b) by 239 days.

(21) Appl. No.: 15/896,553

(22) Filed: Feb. 14, 2018

(65) Prior Publication Data

US 2019/0143619 A1 May 16, 2019

(30) Foreign Application Priority Data

Nov. 16, 2017 (KR) .......................... 10-2017-0153088

(51) Int. Cl.
| | |
|---|---|
| *B29D 30/02* | (2006.01) |
| *B60C 7/10* | (2006.01) |
| *B60C 7/14* | (2006.01) |
| *B60C 7/20* | (2006.01) |
| B29K 21/00 | (2006.01) |
| B60C 11/00 | (2006.01) |
| B60C 9/20 | (2006.01) |
| B60B 9/26 | (2006.01) |

(52) U.S. Cl.
CPC .............. *B29D 30/02* (2013.01); *B60C 7/102* (2013.01); *B60C 7/14* (2013.01); *B60C 7/20* (2013.01); *B29K 2021/006* (2013.01); *B60B 9/26* (2013.01); *B60C 9/2006* (2013.01); *B60C 11/00* (2013.01)

(58) Field of Classification Search
CPC ........... B29D 30/02; B60C 7/20; B60C 7/102; B60C 11/00; B29C 65/48
See application file for complete search history.

(56) References Cited

U.S. PATENT DOCUMENTS

| 4,514,243 A * | 4/1985 | Moore, III ............ B29C 66/636 |
| | | 152/311 |
| 2008/0053586 A1 | 3/2008 | Hanada et al. |
| 2011/0011506 A1 | 1/2011 | Manesh et al. |

FOREIGN PATENT DOCUMENTS

| JP | 2008055928 A | 3/2008 |
| JP | 2008132951 A | 6/2008 |

* cited by examiner

*Primary Examiner* — Christopher T Schatz
(74) *Attorney, Agent, or Firm* — Saliwanchik, Lloyd & Eisenschenk

(57) ABSTRACT

A method of manufacturing an airless tire including a spoke unit includes a first step of injection-molding a first spoke part, a second spoke part, a third spoke part and a fourth spoke part in a disc-like shape. The method further includes a second step of forming a first spoke by fusing the first spoke part and the second spoke part. The method further includes a third step of forming a second spoke by fusing the third spoke part and the fourth spoke part, and a fourth step of forming the spoke unit by fusing the first spoke and the second spoke.

9 Claims, 6 Drawing Sheets

AIRLESS TIRE MANUFACTURING METHOD

CROSS-REFERENCE TO RELATED APPLICATIONS

This application is based on and claims priority from Korean Patent Application No. 10-2017-0153088, filed on Nov. 16, 2017, the disclosure of which is incorporated herein in its entirety by reference.

TECHNICAL FIELD

The present disclosure relates to an airless tire manufacturing method.

BACKGROUND

Tires are mounted on wheels of various motor vehicles ranging from small motor vehicles to heavy motor vehicles and are configured to perform a function of supporting the load of a motor vehicle, a function of transmitting the power of a motor vehicle to the ground, and a function of absorbing vibrations or shocks generated from the ground when a motor vehicle travels.

In the case of a conventional pneumatic tire, air is filled in the inside of the tire, thereby providing an excellent shock-absorbing effect against impact and bending. However, when the tire is damaged due to a puncture or impact from an external object, the internal air pressure is not maintained, which makes it difficult to perform the functions of a tire. In addition, when the tire is damaged during traveling, the handling and braking ability of a motor vehicle may be diminished, causing safety issues.

In order to solve this problem, an airless tire that does not require filling of air has been developed. In the case of the airless tire, spokes are provided between a tread and a wheel that performs the same functions as the internal air pressure of a conventional pneumatic tire. The shock-absorbing effect, the traveling ability and the like of the airless tire are determined by the structure and shape of the spokes. Such spokes are typically manufactured by injection molding. Research has been made to manufacture spokes more efficiently while satisfying tire performance.

SUMMARY

Embodiments of the present disclosure provide an airless tire manufacturing method capable of efficiently manufacturing an airless tire.

In accordance with an aspect of the present disclosure, there is provided a method of manufacturing an airless tire including a spoke unit, including: a first step of injection-molding a first spoke part, a second spoke part, a third spoke part and a fourth spoke part in a disc-like shape; a second step of forming a first spoke by fusing the first spoke part and the second spoke part; a third step of forming a second spoke by fusing the third spoke part and the fourth spoke part; and a fourth step of forming the spoke unit by fusing the first spoke and the second spoke.

The first spoke part to the fourth spoke part may be injection-molded in the same shape.

At least one internal space continuously extending in a circumferential direction of an airless tire may be formed inside each of the first spoke and the second spoke.

When the first spoke and the second spoke are fused to each other, at least one internal space continuously extending in a circumferential direction of an airless tire may be formed between the first spoke and the second spoke.

The first spoke part to the fourth spoke part may be injection-molded using a thermoplastic elastomer.

The first spoke part and the second spoke part may be integrated by fusing the first spoke part and the second spoke part in the second step, the third spoke part and the fourth spoke part may be integrated by fusing the third spoke part and the fourth spoke part in the third step, and the first spoke and the second spoke may be integrated by fusing the first spoke and the second spoke in the fourth step.

The first spoke, the second spoke and the spoke unit may be formed by a thermal fusion process or an ultrasonic fusion process.

A heat dissipating hole extending through the first to fourth spoke parts may be formed in the spoke unit.

The method may further include a fifth step of applying an adhesive agent to an outer circumferential surface of the spoke unit after performing a sanding process and a solvent cleaning process; a sixth step of winding a first cushion gum on the outer circumferential surface of the spoke unit and applying an adhesive agent to an outer circumferential surface of the first cushion gum; a seventh step of bonding a reinforcing layer to the outer circumferential surface of the first cushion gum and applying an adhesive agent to an outer circumferential surface of the reinforcing layer; an eighth step of winding a second cushion gum on the outer circumferential surface of the reinforcing layer; a ninth step of winding a tread rubber on an outer circumferential surface of the second cushion gum; and a tenth step of putting a semi-finished product that has gone through the ninth step into a vulcanization machine and vulcanizing the semi-finished product.

The reinforcing layer may be formed in multilayers using a carbon fiber reinforced plastic.

The method may further include: a fifth step of applying an adhesive agent to an outer circumferential surface of the spoke unit after performing a sanding process and a solvent cleaning process; a sixth step of bonding a reinforcing layer to the outer circumferential surface of the spoke unit and applying an adhesive agent to an outer circumferential surface of the reinforcing layer, the reinforcing layer being formed of a steel belt or an aramid belt; a seventh step of winding a cushion gum on the outer circumferential surface of the reinforcing layer; an eighth step of winding a tread rubber on an outer circumferential surface of the cushion gum; and a ninth step of putting a semi-finished product that has gone through the eight step into a vulcanization machine and vulcanizing the semi-finished product.

According to the airless tire manufacturing method of one embodiment of the present disclosure, it is possible to save the cost and improve efficiency for manufacturing the airless tire.

DETAILED DESCRIPTION

Figure 1:
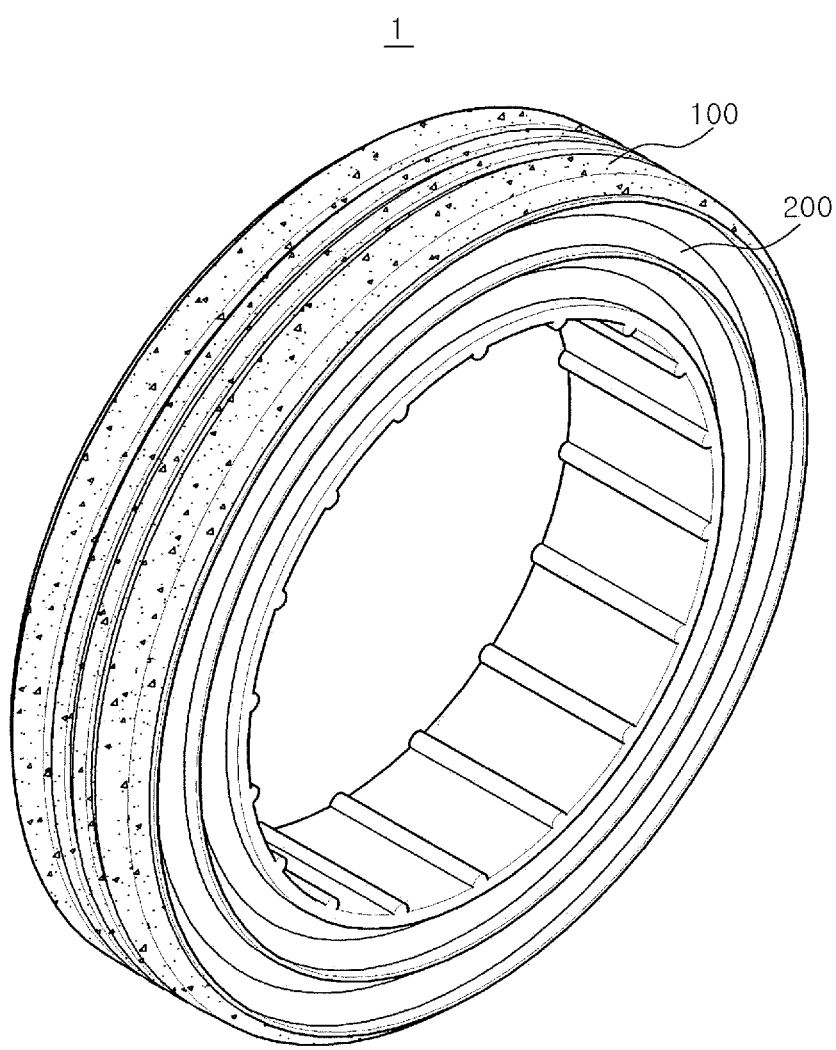
FIG. 1 is a schematic perspective view of an airless tire manufactured by an airless tire manufacturing method according to an embodiment of the present disclosure.

First, it should be noted that the interpretation of the terminologies or terms used throughout the present specification or claims should not be limited to their general or lexical definition, and may need to be understood by the definition and concepts corresponding to the technical spirit of the disclosure based on a principle that the inventor may appropriately define the terms to describe the inventor's invention according to a best mode. Therefore, embodiments and drawings of the disclosure are only examples and thus may not fully represent the technical spirit of the disclosure. Accordingly, it may be understood that the scope of the disclosure may be defined by various equivalents and modifications.

Hereinafter, embodiments will be described in detail with reference to the accompanying drawings. Like reference numerals will be used for like parts throughout the drawings. Also, in describing the disclosure, if it is determined that a detailed description of related known components or functions unnecessarily obscures the gist of the present disclosure, the detailed description thereof will be omitted. For the same reason, some components are exaggerated, omitted or schematically illustrated in the accompanying drawings. The size of the respective components may not entirely reflect the actual size.

Prior to a detailed description of an airless tire manufacturing method according to an embodiment of the present disclosure, a schematic configuration of an airless tire manufactured by an airless tire manufacturing method according to an embodiment of the present disclosure (hereinafter referred to as "airless tire") will be first described with reference to FIGS. 1 to 3.

FIG. 1 is a schematic perspective view of an airless tire manufactured by an airless tire manufacturing method according to an embodiment of the present disclosure. FIG. 2 is a partial cutaway schematic perspective view of an airless tire manufactured by an airless tire manufacturing method according to an embodiment of the present disclosure. FIG. 3 is a radial partial sectional view of the airless tire shown in FIG. 2.

Figure 2:
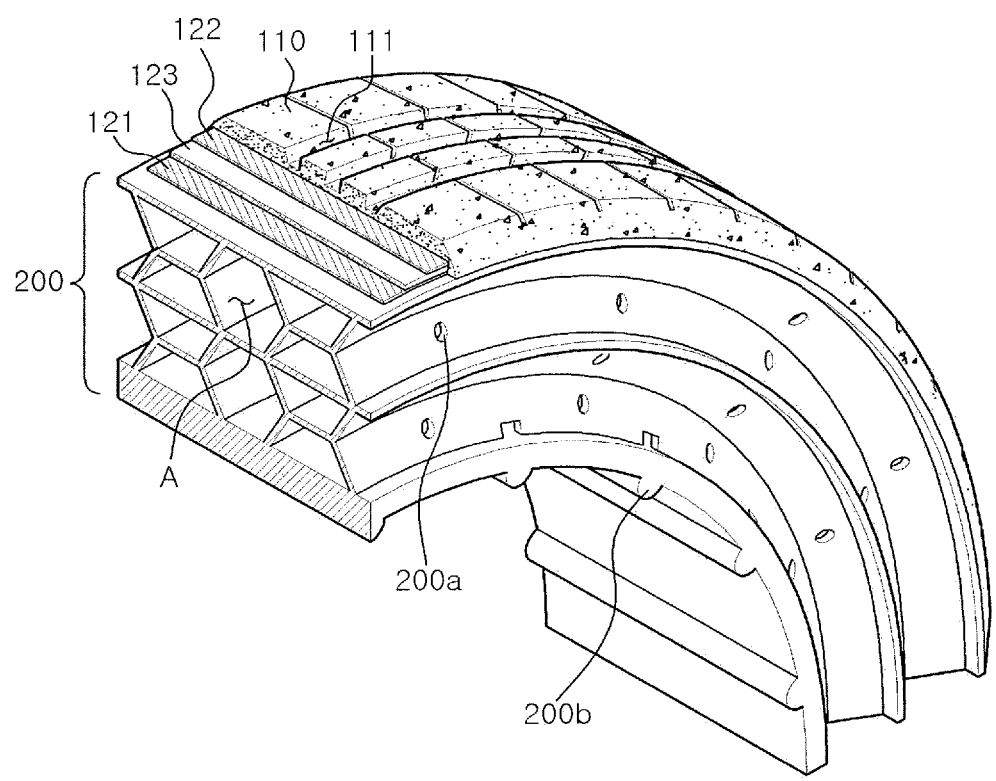
FIG. 2 is a partial cutaway schematic perspective view of an airless tire manufactured by an airless tire manufacturing method according to an embodiment of the present disclosure.
Figure 3:
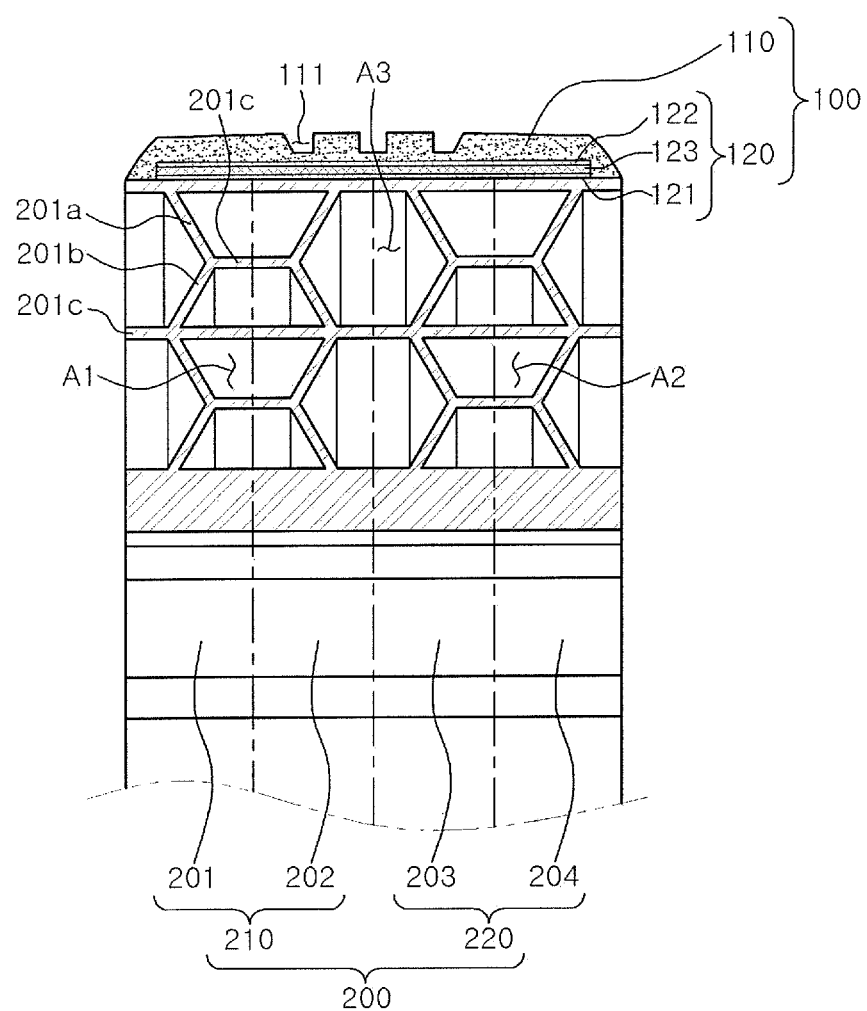
FIG. 3 is a radial partial sectional view of the airless tire shown in FIG. 2.

Referring to FIGS. 1 to 3, the airless tire 1 may include a tread ring 100 configured to make contact with a road surface and a spoke unit 200 provided on the inner circumferential surface of the tread ring 100.

The tread ring 100 is a member disposed on the outer side of the airless tire 1 and may include, for example, a tread rubber 110 and a reinforcing member 120.

The tread rubber 110 may be made of rubber. On the outer circumferential surface of the tread rubber 110, tread blocks defined by tread grooves 111 may be provided in order to adjust the driving force, the braking force and the turning force of the airless tire 1.

The tread grooves 111 may be provided on the outer circumferential surface of the tread rubber 110 so as to be recessed at a predetermined depth. The tread grooves 111 may be formed on the outer circumferential surface of the tread rubber 110 to extend in the circumferential direction, the transverse direction and the diagonal direction.

The terms for the directions will now be defined. The circumferential direction refers to a direction extending along the outer circumferential surface of the tread ring 100 in FIG. 1. The transverse direction refers to a direction extending from the left side to the right side or vice versa in FIG. 3. The diagonal direction refers to a direction deviating from the circumferential direction or the transverse direction.

The reinforcing member 120 may enhance the overall rigidity of the airless tire 1, may improve the shock-absorbing effect by uniformly distributing a vehicle load, and may improve the steering ability of a motor vehicle. The reinforcing member 120 may be provided in a multilayer shape by laminating a plurality of layers.

For example, the reinforcing member 120 may include a first cushion gum 121 making contact with the spoke unit 200, a reinforcing layer 123 bonded to the outer circumferential surface of the first cushion gum 121, and a second cushion gum 122 bonded to the outer circumferential surface of the reinforcing layer 123.

The reinforcing layer 123 may be formed of a carbon fiber reinforced plastic, a steel belt, an aramid belt or the like.

The first cushion gum 121 and the second cushion gum 122 may contain a highly adhesive rubber component. The first cushion gum 121 may be disposed between the spoke unit 200 and the reinforcing layer 123. The inner circumferential surface and the outer circumferential surface of the first cushion gum 121 may be bonded to the spoke unit 200 and the reinforcing layer 123 by means of an adhesive agent. The second cushion gum 122 may be disposed between the reinforcing layer 123 and the tread rubber 110. When the reinforcing layer 123 is formed of a steel belt or an aramid belt, the first cushion gum 121 may be omitted.

The spoke unit 200 may be bonded to the inner circumferential surface of the tread ring 100. The spoke unit 200 may be formed of an injection-molded article. For example, the spoke unit 200 may be made of a thermoplastic elastomer (TPE) including at least one of a thermoplastic polyester elastomer (TPEE), a thermoplastic polyurethane elastomer (TPU), a thermoplastic olefin elastomer (TPO) and a thermoplastic polyamide elastomer (TPAE). In addition, the spoke unit 200 may be produced by fusing a plurality of injection-molded spoke parts.

Internal spaces A (A1, A2 and A3) may be formed in the spoke unit 200. The internal spaces A may be formed continuously in the circumferential direction and may be arranged in the radial direction and the transverse direction. In the case of the spoke unit 200 including the internal spaces A continuously extending in the circumferential direction, it is very difficult to produce the spoke unit 200 with only one injection-molding operation. Therefore, the spoke unit 200 including the internal spaces A may be produced by a process of individually injection-molding spoke parts and fusing the individually injection-molded spoke parts. A detailed description thereof will be described later.

At least one heat dissipating hole 200a may be formed in the spoke unit 200. The heat generated inside the spoke unit 200 may be discharged to the outside through the heat dissipating hole 200a. As a result, it is possible to prevent the spoke unit 200 from being heated excessively during the operation of the airless tire 1.

Although not shown, the spoke unit 200 may be coupled to a separate wheel (not shown). The spoke unit 200 may be mechanically coupled to the wheel. In order to prevent a slip between the spoke unit 200 and the wheel during the operation of the airless tire 1, slip prevention protrusions 200b protruding inward in the radial direction may be formed on the inner circumferential surface of the spoke unit

200. The slip prevention protrusions 200*b* are respectively inserted into grooves formed on the outer circumferential surface of the wheel in a shape corresponding to the shape of the slip prevention protrusion 220*b* to prevent the spoke unit 200 from slipping from the wheel during operation of the airless tire 1.

Hereinafter, an airless tire manufacturing method for manufacturing the above-described airless tire 1 will be described with reference to FIGS. 4 to 6.

Figure 4:
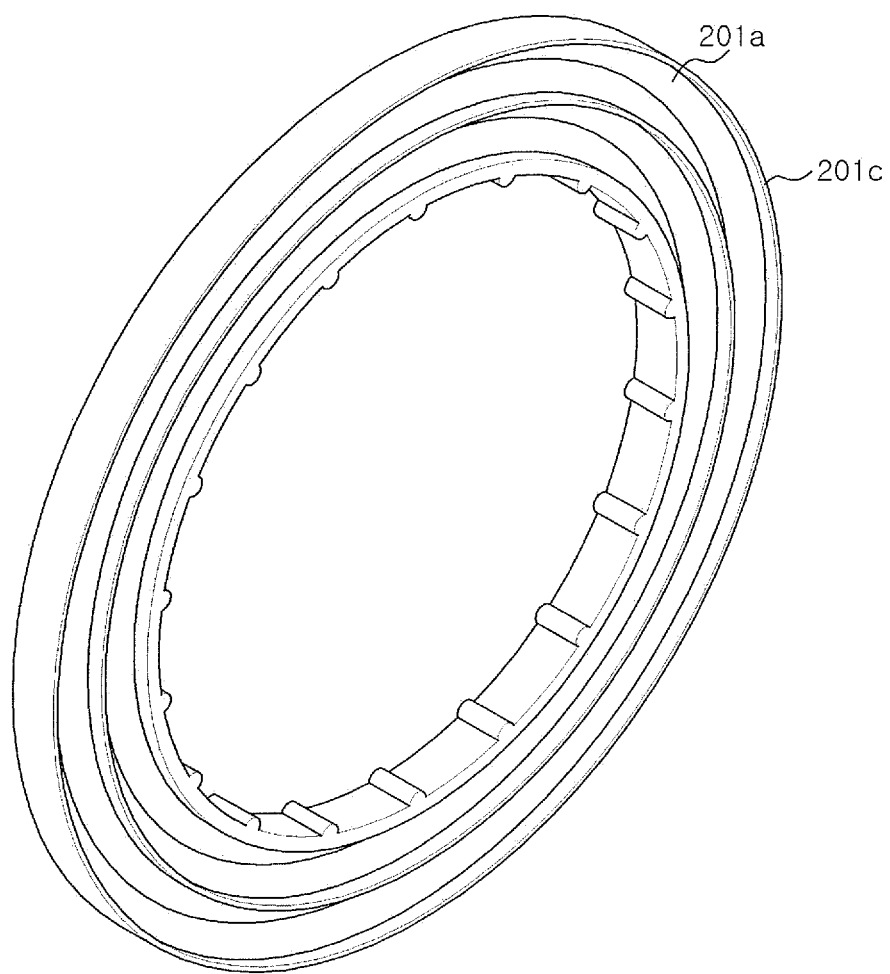
FIG. 4 is a schematic perspective view of a first spoke part included in the airless tire shown in FIG. 2.

FIG. 4 is a schematic perspective view of a first spoke part included in the airless tire shown in FIG. 2. FIG. 5 is a schematic perspective view of the first spoke part shown in FIG. 4, which is viewed from another angle. FIG. 6 is a schematic flowchart showing an airless tire manufacturing method according to an embodiment of the present disclosure.

Figure 5:
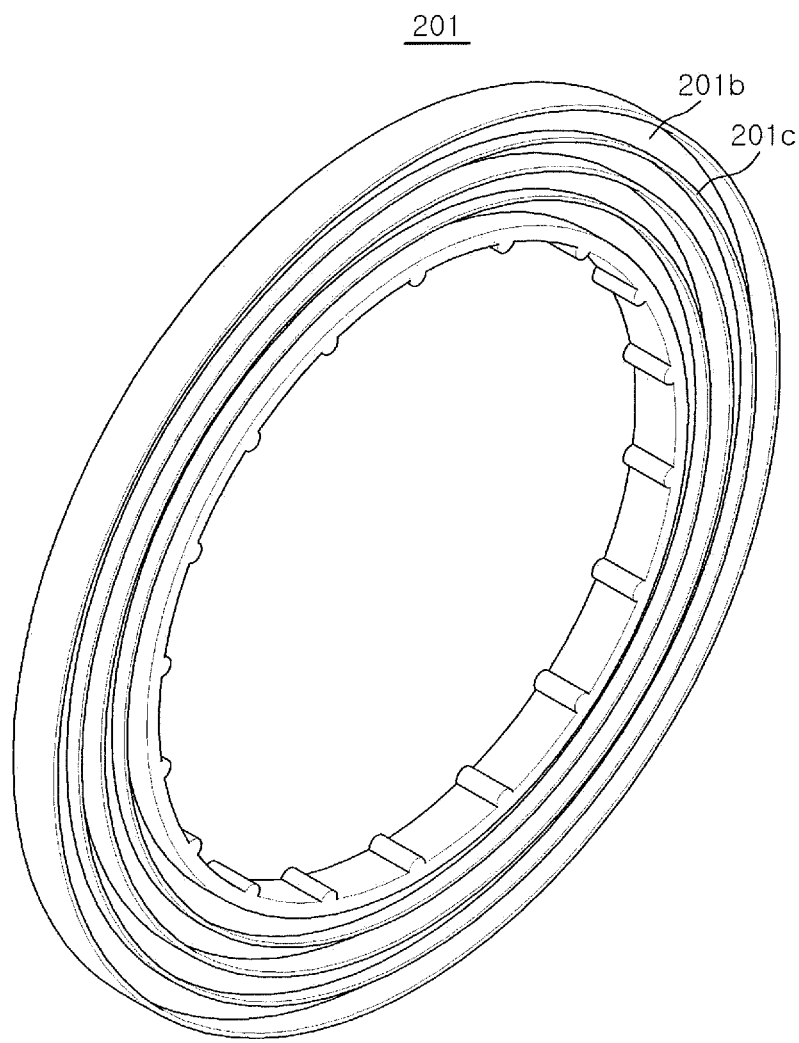
FIG. 5 is a schematic perspective view of the first spoke part shown in FIG. 4, viewed from another angle.
Figure 6:
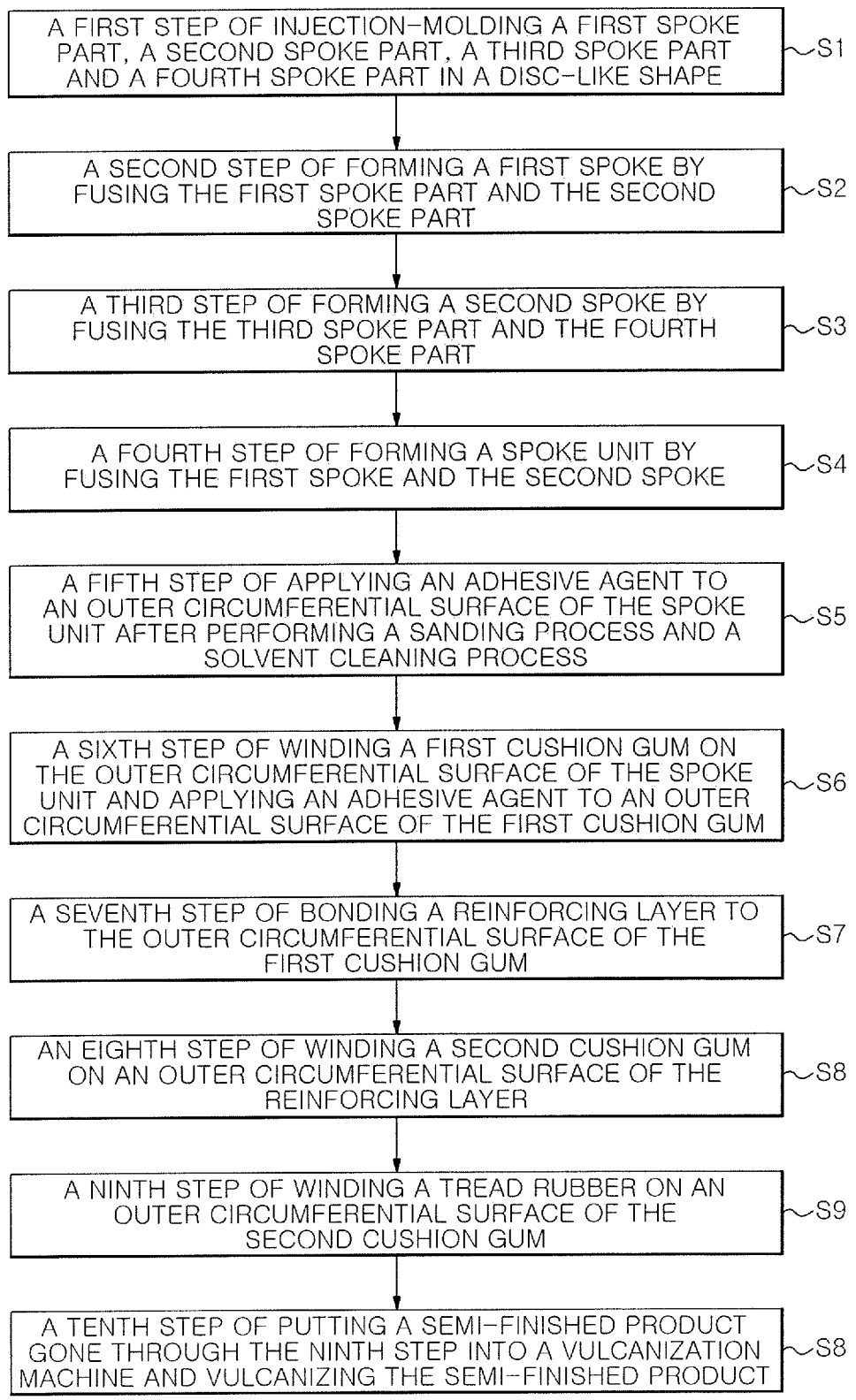
FIG. 6 is a schematic flowchart showing an airless tire manufacturing method according to an embodiment of the present disclosure.

Referring to FIGS. 4 to 6, the airless tire manufacturing method according to an embodiment of the present disclosure includes a first step S1 of injection-molding a first spoke part 201, a second spoke part 202, a third spoke part 203 and a fourth spoke part 204, a second step S2 of forming a first spoke 210 by fusing the first spoke part 201 and the second spoke part 202, a third step S3 of forming a second spoke 220 by fusing the third spoke part 203 and the fourth spoke part 204, and a fourth step S4 of forming a spoke unit 200 by fusing the first spoke 210 and the second spoke 220.

In the first step S1, a process of injection-molding the first spoke part 201, the second spoke part 202, the third spoke part 203 and the fourth spoke part 204 may be performed. The first to fourth spoke parts 201, 202, 203 and 204 are members coupled to each other to form the spoke unit 200 and may be injection-molded using thermoplastic elastomers. For example, the first to fourth spoke parts 201, 202, 203 and 204 may be provided as injection-molded articles containing a thermoplastic elastomer (TPE) including at least one of a thermoplastic polyester elastomer (TPEE), a thermoplastic polyurethane elastomer (TPU), a thermoplastic olefin elastomer (TPO) and a thermoplastic polyamide elastomer (TPAE).

The first to fourth spoke parts 201, 202, 203 and 204 may be injection-molded in the same shape. Thus, in the case of the airless tire manufacturing method according to an embodiment of the present disclosure, the first to fourth spoke parts 201, 202, 203 and 204 may be injection-molded using one injection molding mold.

When injection-molding the first to fourth spoke parts 201, 202, 203 and 204, heat dissipating holes 200*a* may be formed to extend through the first to fourth spoke parts 201, 202, 203 and 204.

In the second step S2, a process of forming the first spoke 210 by fusing the first spoke part 201 and the second spoke part 202 may be performed. At this time, the first spoke part 201 and the second spoke part 202 may be fused in a state in which they overlap each other in the transverse direction. The fusing process may be a thermal fusion process or an ultrasonic fusion process. For example, when the fusing process is a thermal fusion process, the first spoke part 201 and the second spoke part 202 may be fused by putting the first spoke part 201 and the second spoke part 202 into a hot plate fusing machine (not shown), pressing/melting the first spoke part 201 and the second spoke part 202 to obtain a fused object, and then compressing/cooling the fused object. When the fusing process is completed, the first spoke part 201 and the second spoke part 202 are integrated to form the first spoke 210.

The outer surface of the first spoke part 201 may be divided into a first surface 201*a* and a second surface 201*b*.

The first surface 201*a* and the second surface 201*b* may have protrusions 201*c*. In this regard, the first surface 201*a* and the second surface 201*b* may be formed in different shapes and one of them may be connected to a surface with the same shape of the second spoke part 202 arranged adjacent thereto. In other words, the first surface 201*a* of the first spoke part 201 may be connected one of the two surfaces of the second spoke part 202 having the same shape as the first surface 201*a* of the first spoke part 201. At this time, the protrusions 201*c* of the first spoke part 201 may be brought into contact with, and fused to, the corresponding protrusions of the second spoke part 202.

Now, the principle of the first spoke part 201 and the second spoke part 202 being thermally fused to each other will be briefly described. When the first spoke part 201 and the second spoke part 202 are put into a hot plate fusing machine and are heated, intermolecular diffusion of a thermoplastic elastomer of the material of the first spoke part 201 and the second spoke part 202 occurs at the bonded portions of the first spoke part 201 and the second spoke part 202 to be mixed. When compressed and cooled, the first spoke part 201 and the second spoke part 202 may be hardened and fused together.

As the first spoke part 201 and the second spoke part 202 are fused together, at least one internal space A1 continuously extending in the circumferential direction of the airless tire 1 may be formed between the first spoke part 201 and the second spoke part 202. In other words, at least one internal space A1 continuously extending in the circumferential direction may be formed inside the first spoke 210. In this case, a plurality of internal spaces A1 may be arranged in the first spoke 210 along the radial direction of the airless tire 1.

In the third step S3, a process of forming the second spoke 220 by fusing the third spoke part 203 and the fourth spoke part 204 may be performed in the same manner as in the second step S2. The fusing process of the third spoke part 203 and the fourth spoke part 204 is the same as the fusing process of the first spoke part 201 and the second spoke part 202. Therefore, a description thereof will be omitted.

The third spoke part 203 and the fourth spoke part 204 are fused together to integrally form the second spoke 220. In this case, the second spoke 220 may be formed in the same shape as the first spoke 210. At least one internal space A2 continuously extending in the circumferential direction may be formed inside the second spoke 220, and a plurality of internal spaces A2 may be arranged in the second spoke 220 along the radial direction of the airless tire 1.

In the fourth step S4, a process of fusing the first spoke 210 and the second spoke 220 to form the spoke unit 200 may be performed. The first spoke 210 and the second spoke 220 may be fused together by being put into the hot plate fusing machine, which is used for fusing the first to fourth spoke parts 201, 202, 203 and 204 in the second step S2 and the third step S3, in a transversely overlapped state. When the first spoke 210 and the second spoke 220 are fused to each other, at least one internal space A3 continuously extending in the circumferential direction of the airless tire 1 may be formed between the first spoke 210 and the second spoke 220. For example, a plurality of internal spaces A3 may be arranged in the radial direction by fusing the first spoke 210 and the second spoke 220 together. The first spoke 210 and the second spoke 220 may be integrally formed by the fusing process to form the spoke unit 200.

As described above, the airless tire manufacturing method according to an embodiment of the present disclosure is capable of performing a molding work with a single injection molding mold because the first to fourth spoke parts 201, 202, 203 and 204 are injection-molded in the same shape. In addition, it is possible to form the continuous internal spaces inside the spoke unit 200 by dividing the spoke unit 200 into the first to fourth spoke parts 201, 202, 203 and 204 and fusing the respective spoke parts together.

In a fifth step S5, a process of applying an adhesive agent to the outer circumferential surface of the spoke unit 200 after performing a sanding process and a solvent cleaning process may be performed. In a sixth step S6, a process of winding the first cushion gum 121 on the outer circumferential surface of the spoke unit 200 and applying an adhesive agent to the outer circumferential surface of the first cushion gum 121 may be performed. However, if the reinforcing layer 123 is formed of a steel belt or an aramid belt as described above, the first cushion gum 121 may be omitted.

After the adhesive agent is applied to the outer circumferential surface of the first cushion gum 121, a seventh step S7 of bonding the reinforcing layer 123 to the outer circumferential surface of the first cushion gum 121 may be performed.

The reinforcing layer 123 may be formed of a carbon fiber reinforced plastic, a steel belt, an aramid belt, or the like.

When the reinforcing layer 123 is formed of a carbon fiber reinforced plastic, the carbon fiber reinforced plastic may be manufactured to have a size corresponding to the outer diameter of the spoke unit 200.

When the reinforcing layer 123 is formed of a steel belt or an aramid belt, the steel belt or the aramid belt may be wound around the outer circumferential surface of the first cushion gum 121 and may serve as a reinforcing layer. When winding a steel belt or an aramid belt around the outer circumferential surface of the first cushion gum 121, it may be wound in multiple layers.

In an eighth step S8, a process of winding the second cushion gum 122 around the outer circumferential surface of the reinforcing layer 123 may be performed. In this case, when the reinforcing layer 123 is made of a carbon fiber reinforced plastic, a process of applying an adhesive agent to the outer circumferential surface of the reinforcing layer 123 may be performed in advance.

Then, a ninth step S9 of winding a tread rubber around the outer circumferential surface of the second cushion gum 122 may be performed. When the ninth step S9 is completed, a tenth step S10 of putting a semi-finished product that has gone through the ninth step S9 into a vulcanization machine and vulcanizing the semi-finished product may be performed.

While the present disclosure has been shown and described with respect to the embodiments, it will be understood by those skilled in the art that various changes and modifications may be made without departing from the scope of the disclosure as defined in the following claims.

What is claimed is:

1. A method of manufacturing an airless tire including a spoke unit, comprising:
    a first step of injection-molding a first spoke part, a second spoke part, a third spoke part and a fourth spoke part in a disc-like shape;
    a second step of forming a first spoke by fusing the first spoke part and the second spoke part;
    a third step of forming a second spoke by fusing the third spoke part and the fourth spoke part; and
    a fourth step of forming the spoke unit by fusing the first spoke and the second spoke;
    a fifth step of applying an adhesive agent to an outer circumferential surface of the spoke unit after performing a sanding process and a solvent cleaning process;
    a sixth step of winding a first cushion gum on the outer circumferential surface of the spoke unit and applying an adhesive agent to an outer circumferential surface of the first cushion gum;
    a seventh step of bonding a reinforcing layer to the outer circumferential surface of the first cushion gum and applying an adhesive agent to an outer circumferential surface of the reinforcing layer;
    an eighth step of winding a second cushion gum on the outer circumferential surface of the reinforcing layer;
    a ninth step of winding a tread rubber on an outer circumferential surface of the second cushion gum; and
    a tenth step of putting a semi-finished product that has gone through the ninth step into a vulcanization machine and vulcanizing the semi-finished product.

2. The method of claim 1, wherein the first spoke part, the second spoke part, the third spoke part, and the fourth spoke part are injection-molded in the same shape.

3. The method of claim 1, wherein at least one internal space continuously extending in a circumferential direction of an airless tire is formed inside each of the first spoke and the second spoke.

4. The method of claim 1, wherein when the first spoke and the second spoke are fused to each other, at least one internal space continuously extending in a circumferential direction of an airless tire is formed between the first spoke and the second spoke.

5. The method of claim 1, wherein the first spoke part, the second spoke part, and third spoke park and the fourth spoke part are injection-molded using a thermoplastic elastomer.

6. The method of claim 1, wherein the first spoke part and the second spoke part are integrated by the fusing in the second step,
    the third spoke part and the fourth spoke part are integrated by the fusing in the third step, and
    the first spoke and the second spoke are integrated by the fusing in the fourth step.

7. The method of claim 1, wherein the first spoke, the second spoke and the spoke unit are formed by a thermal fusion process or an ultrasonic fusion process.

8. The method of claim 1, wherein a heat dissipating hole extending through the first spoke part, the second spoke part, the third spoke part, and the fourth spoke part is formed in the spoke unit.

9. The method of claim 1, wherein the reinforcing layer is formed in multilayers using a carbon fiber reinforced plastic.

* * * * *